March 10, 1959 J. J. RADOMSKI ET AL 2,877,302

TELEPHONE EQUIPMENT

Filed April 23, 1956 3 Sheets-Sheet 1

INVENTORS
JOSEPH J. RADOMSKI
CARL M. WENRICH
ALLAN R. ROYLE

BY Smoker & Mattis

ATTORNEYS

March 10, 1959 J. J. RADOMSKI ET AL 2,877,302

TELEPHONE EQUIPMENT

Filed April 23, 1956 3 Sheets-Sheet 2

INVENTORS
JOSEPH J. RADOMSKI
CARL M. WENRICH
ALLAN R. ROYLE

BY Smith & Mathis

ATTORNEYS

TELEPHONE EQUIPMENT

Filed April 23, 1956 3 Sheets-Sheet 3

INVENTORS
JOSEPH J. RADOMSKI
CARL M. WENRICH
ALLAN R. ROYLE
BY Smuller & Mattis
ATTORNEYS United States Patent Office 2,877,302

Patented Mar. 10, 1959

2,877,302

TELEPHONE EQUIPMENT

Joseph J. Radomski, Shillington, and Allan R. Royle and Carl M. Wenrich, Reading, Pa., assignors to Gai-Tronics Corporation, Reading, Pa., a corporation of Delaware Application April 23, 1956, Serial No. 579,842

11 Claims. (Cl. 179—1)

The present invention relates to telephone equipment which includes, in one instrument, a conventional telephone subset, a loudspeaker, and connections for a microphone. The components are connected in such a way that the handset may be employed in the conventional manner, or the microphone and loudspeaker may be used together to provide hands-free operation over standard two-wire telephone facilities.

In the past, devices of this sort have been characterized by the need for an excessive number of switches to prevent interference between incoming and outgoing signals, by the need for complicated hook-ups, by the necessity for providing space for bulky equipment, by the complexity of installation, and other difficulties and disadvantages.

Various solutions to the difficulties outlined have been tried with only partial success.

Interference between incoming and outgoing signals has been commonly corrected by switches. Where these switches were manually operated, the disadvantage of having constantly to press a switch to speak and then press one to listen is obvious. Where the switches have been operated by voice or other indirect means, the limitation of having to speak and then to listen, without interjecting anything into the conversation while the other party is speaking, precludes normal conversation. Elimination of interference is not completely satisfactory with switches in any case.

The bulkiness and difficulty of installation which are characteristic of the prior art equipment have been overcome to some degree by making components smaller, but this equipment still involves several components which must be separately fastened to walls and furniture, and then interconnected, with the expenditure of a great deal of time and effort.

Another difficulty with prior art equipment has been that of expense. The equipment has been especially designed for a particular use and, consequently, is more expensive than it would be if it incorporated standard units which are adapted to special purposes by small modifications.

It is a general object of the present invention to surmount the limitations of the prior art and provide additional advantages, as set forth in what follows.

It is an object of this invention to provide a telephone substation which will enable the user to maintain two-way communications over a microphone and a loudspeaker, without interference between the incoming and outgoing signals, and without the use of switches, once the connection is established.

It is an additional object of this invention to provide a telephone substation which may be used in the conventional manner with a handset, if desired, and also with a microphone and a loudspeaker which, once switched on, may be operated without further use of the hands.

It is a further object of this invention to provide a hands-free telephone system which is simple to operate, which includes means to indicate when it is operative, which may be used with conventional dialing equipment, or other conventional telephone equipment, and which may be operated as a conventional telephone if desired.

It is a further object of this invention to provide a telephone substation which combines a handset with a loudspeaker and a microphone plug in one instrument which is compact, inexpensive and easy to install.

Another object of this invention is to provide a hands-free telephone substation in which privacy may be assured by either using the handset or employing means to disconnect the microphone.

It is a further object of this invention to provide a hands-free telephone system which is substantially independent of differences in line impedances.

Other objects and features of the invention will become apparent from the following description, together with the accompanying drawings, which show a preferred embodiment, in which.

Figures 1, 2:
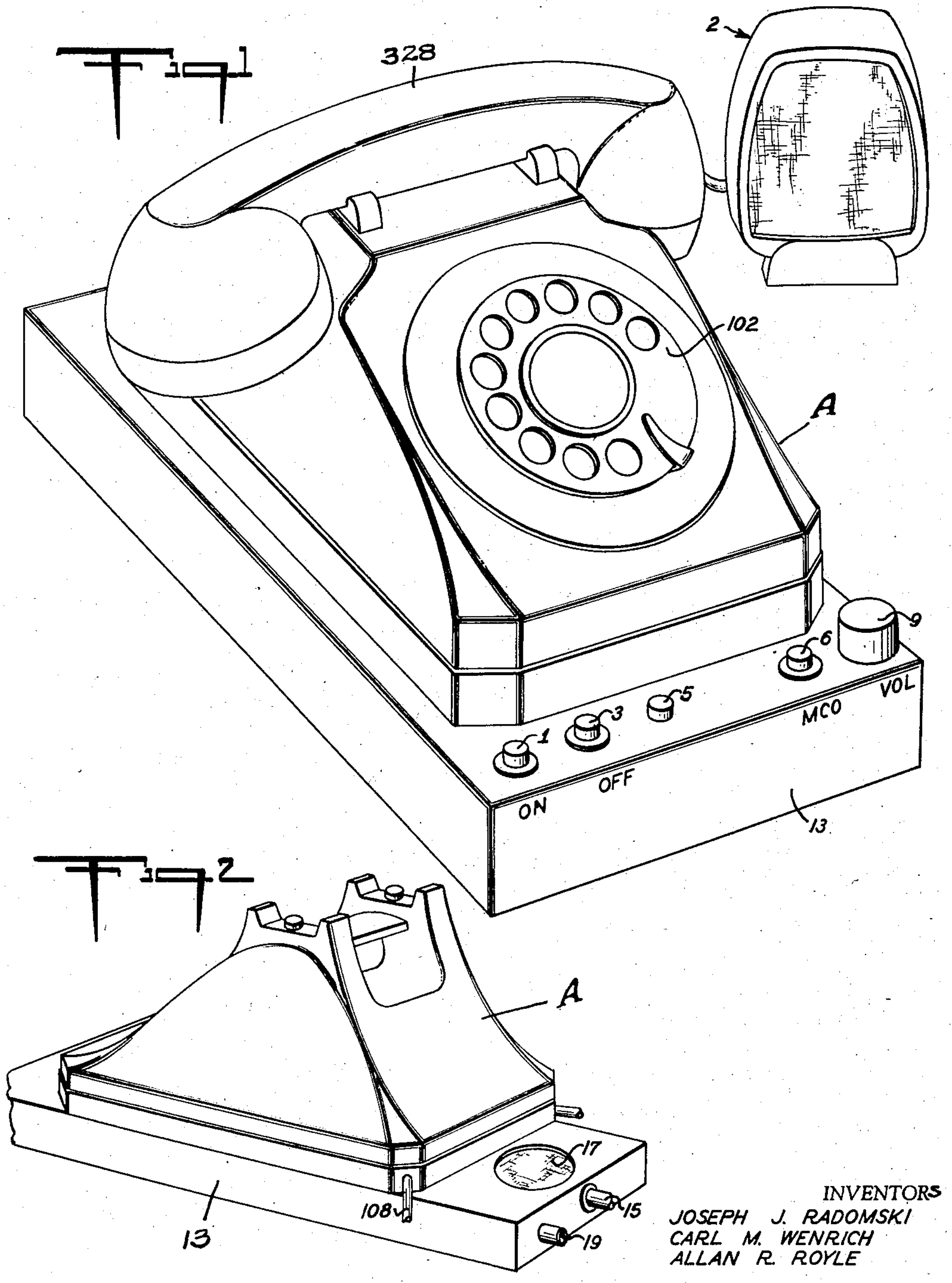
Fig. 1 is a perspective view from the front, of the instrument as it appears when it is installed, or is ready to be installed.
Fig. 2 is a rear perspective view, showing the speaker, microphone connection, power line connection, and the telephone line connection.

The invention is shown in Figs. 1 and 2 in connection with a conventional telephone instrument generally indicated at A, provided with the usual dialing switch 102 and handset 328. This instrument is mounted on a base 13, within which suitable controls are provided to connect a microphone 2 and a loudspeaker 162, which latter is located within the base 13 under the grill 17, and with the telephone line 108.

These controls include an "on" switch 1 which serves to connect the hands-free function, i. e., the microphone 2 and speaker 162, to the line; and an "off" switch 3 which will disconnect the hands-free function. A pilot lamp 5 will be energized at any time the hands-free function is connected to the line. A muting switch MCO, indicated at 6, may be employed to short the microphone and thus prevent anyone at the other end of the line from hearing what is said near the microphone 2. A knob 9 on the telephone A adjusts the volume control 128 of the loudspeaker 162.

The dial 102 occupies its usual position on the telephone A and connects internally to operate with either the handset 328 or the hands-free function.

Base 13 is mounted on live rubber feet which insulate it from the flat surface on which it rests, such as a desk top, thus reducing mechanical or acoustic coupling from the loudspeaker 162 to the microphone 2. These rubber feet act as acoustic isolating means to prevent regeneration from occurring.

The microphone 2, being small and easily positioned, can be so placed as to be in the most efficient position so far as sound pick-up is concerned. This allows a wider choice of conditions which can be met without increasing the amplifier gain, thus increasing the overall stability of the system.

The hands-free telephone, being a single unit with only one remote component, the ceramic-crystal microphone, does not require that long interconnecting cables be used to join the various segments of the instrument, thus simplifying the problem of hum, cable feedback and cross-talk prevention.

In order to make the hands-free telephone into a simple unit, the base 13 is designed to contain the following components: a three-stage microphone amplifier which raises the level of the microphone to standard telephone line level; a hybrid network which greatly attenuates the microphone signal in the loudspeaker channel; a two-stage loudspeaker amplifier which raises the incoming signal level to a value which will drive a loudspeaker; and a power supply which provides filament current, relay current, indicator lamp current and anode and screen current. In addition the base includes the switches, volume level adjustment, pilot lamp, and muting switch or microphone cut-off switch, indicated above, as well as the telephone, power, and microphone connections shown in Figs. 1 and 2.

In Fig. 2 the telephone line 108 is shown connected directly to the telephone. The loudspeaker 162 is mounted in the base, with its axis directed vertically through grill 17, thus beaming the high frequency upwards and effectively lengthening the acoustical path between the speaker and the microphone for the high frequencies.

Mounting the loudspeaker in the amplifier housing provides a large baffle for the back wave of the speaker, thus increasing its efficiency over a wider frequency range. Less amplifier gain is thus required, which increases the stability of the whole assembly.

The microphone plug 19 permits the direct connection of the microphone to the base. Line 15 is a power line to be plugged into any suitable voltage supply (generally 110 volts A. C.).

Figures 3, 4A:
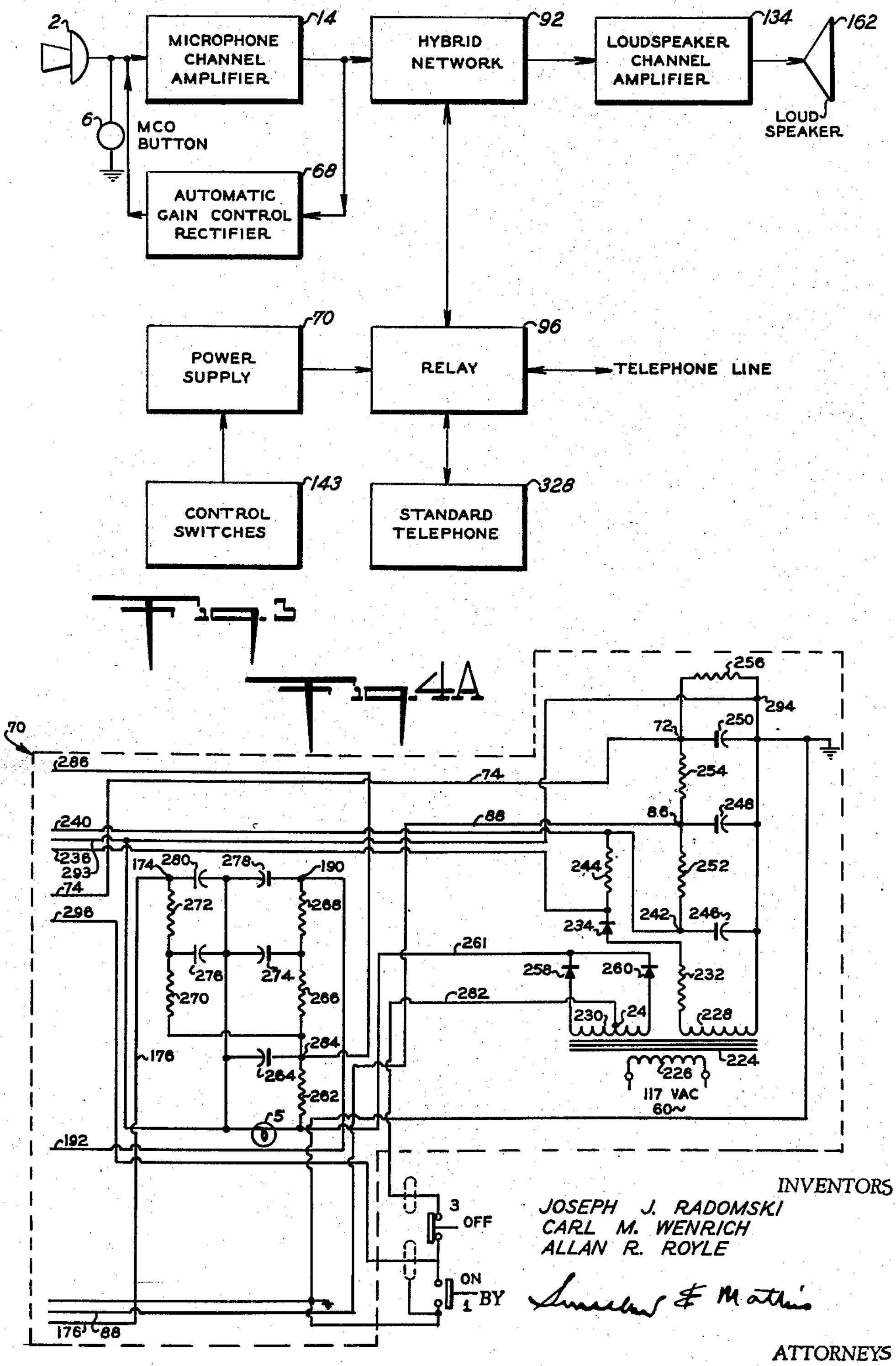
Fig. 3 is a block diagram showing the interconnection of the various components.
Figs. 4 and 4A, together, constitute a detailed schematic view of the circuits, showing the interconnections thereof.

In Fig. 3, the microphone 2 is shown connected through amplifier 14 to the hybrid network 92 and then to the relay. The hybrid network 92 is also shown connected through loudspeaker amplifier 134 to the loudspeaker 162.

Amplifier 14 has a feedback circuit through automatic gain control rectifier 68, which will prevent blasting if speaking too close to the microphone.

Switches 1 and 3 control the power supply 70, and through it, the relay 96. Closing momentary-contact, normally-open switch 1 will operate the relay and connect hybrid network 92 to the line 108, at the same time disconnecting the standard telephone A. Subsequently, either depressing momentary-contact, normally-closed switch 3 to open it, or lifting the receiver 328 off telephone A, will serve to disconnect the hybrid network from the line and connect the standard telephone to the line.

The dialing equipment in the standard telephone A connects to the line through the relay in such a manner that it may be operated even when the handset is disconnected. Dialing equipment is available, therefore, when the hands-free function is placed in use by depressing the "on" switch 1.

If the user does not want the listener on the other end of telephone line 108 to hear what is being said near the microphone, he can short the microphone to ground, through the switch 6.

Figure 4:
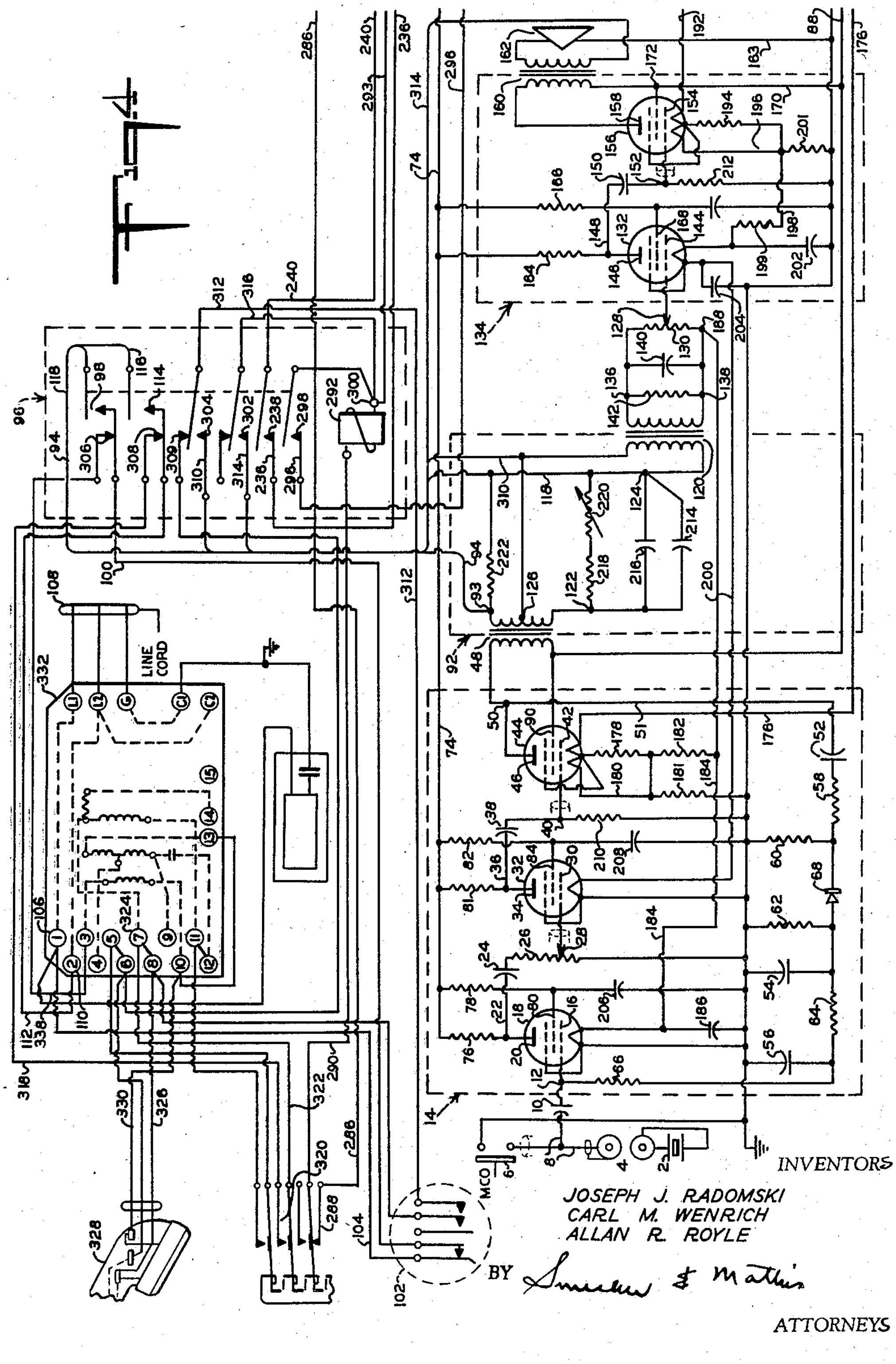

Referring now to Figs. 4 and 4A, microphone 2 is connected through microphone connection 4 to line 8, and then through condenser 10 to terminal 12 at the input of amplifier 14.

The switch 6 is a normally-open, momentary-contact switch, which may be pressed to ground the microphone. The terminal 12 connects to grid 16 in tube 18, to control the output of plate 20. Plate 20 feeds through line 22 and condenser 24 to potentiometer 26. The slide contact 28 of potentiometer 26 may be used to provide control of the gain of tube 32 through grid 30. Tube 32 feeds through its plate 34 through line 36, and condenser 38, to terminal 40. Terminal 40 connects to the grid 42 of tube 44. This tube provides the output of amplifier 14 from its plate 46 to bifilar wound transformer 48.

From terminal 50 on the primary winding of transformer 48 there is provided an automatic volume control for amplifier 14 through line 51 to condensers 52, 54 and 56, resistors 58, 60, 62, 64, and 66, and rectifier 68 to the input terminal 12 of triode 18. A more accurate designation of this circuit is that of an automatic stabilizing gain control, since its purpose is to stabilize the gain and in this manner prevent unnecessary feedback as well as distortion. The use of this circuit will allow a higher level of operation with more positive stability.

The automatic stabilizing gain control adjusts the output of the amplifier so that the gain is inversely proportional to the output amplitude, thus limiting the feedback, if it does occur, to a value which will not be objectionable until the loudspeaker level can be corrected by turning the knob 9, of the volume control 128, counterclockwise. The automatic stabilizing gain control also prevents blasting and overload distortion when too high an input signal is impressed upon the microphone. It also prevents discomfort to the listener when the microphone is moved about or inadvertently dropped.

Power is supplied to the amplifier 14 from supply 70 (Fig. 4A). Power for the plate circuits and the screen grids of tubes 18 and 32 is provided from terminal 72 through line 74; then through resistor 76 (Fig. 4) to plate 20, through resistor 78 to screen grid 80, through resistor 81 to plate 34, and through resistor 82 to screen grid 84. Power to tube 44 is supplied from terminal 86 through line 88, through transformer 48 to plate 46, and directly from line 88 to screen grid 90.

The center tapped secondary of transformer 48 is a part of hybrid network 92. The hybrid network 92 is actually a balance bridge designed to provide a means for segregating the input from the output signals. The signal from the amplifier 14 is transmitted from terminal 93 through lead 94, to relay 96, via contacts 98, through line 100, through dial 102, to line 104, to terminal 106, and thence to telephone line 108.

The input from telephone line 108 passes through terminal 110 to line 112, contacts 114, line 116, and line 118, to the primary of transformer 120. The output signal from amplifier 14 appearing on lead 93 is 180° out of phase with that appearing on terminal 122 so that the voltage from these two sources on terminal 124 is substantially 0, and very little of the signal from the microphone appears across the primary of transformer 120. The signal from the telephone line on line 118 appears at terminal 124 across the primary of transformer 120 to the center tap 126 of transformer 48. Consequently, this signal is present on the secondary of transformer 120 and is transmitted through the slide 128 (which serves as the volume control) of potentiometer 130 to triode 132 of amplifier 134. The signal on the terminals 136 and 138 of transformer 120 is shunted by capacitor 140 which serves to slope the high frequency response of the amplifier 134 downward, thus reducing the tendency to sing or feed back.

The input, on slide 128, to tube 132, controls the grid 144 and the output on plate 146, which feeds through line 148 and condenser 150 to terminal 152. The signal on grid 154, in turn, controls the output of plate 158 to transformer 160 and loudspeaker 162.

The power supply to tube 132 is provided from terminal 72 through line 74, and then through resistor 164 to plate 146, and through resistor 166 to screen grid 168. The power supply for tube 156 is provided from the terminal 86, through line 88, through line 170, and terminal 172 to the screen grid, and from terminal 172 through the primary of transformer 160 to plate 158.

It should be noted that tubes 18, 32, 44, 132 and 156, may be triodes, pentodes, transistors, or other suitable types. In the preferred embodiment they are pentodes of fixed mu. The use of transistors, or different tube types, would require some changes in the auxiliary circuits, but no departure from the basic concepts of the invention.

The filament supply for tubes 18 and 44 is connected from terminal 174 through line 176, to the filament in tube 44, and from there through resistor 178, line 180, resistor 182, line 184, through the filament in tube 18, to ground. There is a by-pass condenser 186, connecting line 184 to ground. There is also a resistor 181, connecting line 180 and the cathode of tube 44 to ground. Line 184 also connects at terminal 188 to potentiometer 130. The purpose of this latter connection is to provide further for the neutralization of any stray signal to transformer 120 as a result of the unbalance of the hybrid network.

The filament supply to tubes 32, 132, and 156, is connected from terminal 190, through line 192, to the filament in tube 156, and thence through resistor 194 in parallel to line 196, through line 198 and resistor 199 to the filament in tube 132, and then through line 200 and through the filament in tube 32 to ground. Resistor 201 connects line 198 to ground. Two by-pass condensers, 202 and 204, are provided, one on line 200, and the other on line 198.

Condensers 206 and 208 are by-pass condensers for screen grid 80 and screen grid 84, respectively. Resistor 210 is a bias resistor for grid 42, and resistor 212 is a bias resistor for grid 154.

Hybrid network 92 has two condensers 214 and 216 in parallel, which balance the capacitive reactance of the telephone line. Resistors 218 and variable resistor 220 balance the resistance in resistor 222, coupled with the resistance of the line. Resistance 222 is relatively large in order to reduce the comparative change from a heavily loaded to a lightly loaded line, thus allowing the hybrid network to be more nearly in balance for a wider variety of line impedances.

In the power supply 70 (Fig. 4A), is a power transformer 224, with a primary winding 226 which is connected across the standard 115 volt, 50 to 60 cycle line. This transformer has two secondaries 228 and 230. Secondary 228 provides 120 volts isolated from the primary. The other secondary, 230, is a center tapped winding which provides 24 volts from the center tap to either side. Secondary 228 feeds through a resistor 232 to a half-wave selenium rectifier 234, and then through line 236, through relay contacts 238 (Fig. 4), to line 240 and terminal 242 (Fig. 4A). From that point it feeds a three-section RC filter which has the effect of greatly attenuating all hum and noise components and which has two output terminals 86 and 72.

Resistor 244 in the power supply 70 (Fig. 4A), is placed across the contact points 238 of the relay 96 and in series with the power supply and the filters, so that the voltages from the power supply remain constant. This arrangement prevents the filter sections from introducing a time constant in the plate and screen supply circuit of the amplifiers, thus stabilizing the gains and allowing the amplifiers to be switched on and off at high levels without the disturbances normally associated with the switching operation.

The resistor 244 (Fig. 4A) and associated contacts on the relay serve to maintain a constant voltage on capacitors 246, 248 and 250, by the following sequence of operation: When the hands-free function is being used, the tube anode current drain would tend to reduce the voltage across the filter network to some value below peak voltage. If, however, the voltage is reduced by the resistor 244, in series with resistors 252, 254, and 256, when the telephone is in standby, and if the resistor 244 is shorted out when the hands-free function is used, then the voltage is maintained at a constant level.

The filament pilot lamp 5 and relay power supplies are provided by the secondary 230 which feeds germanium rectifiers 258 and 260, which provide a full wave output of 24 volts, through line 261 and resistor 262, across condenser 264. The filters represented by resistors 266, 268, 270, and 272, and condensers 274, 276, and 280, attenuate the hum and noise in the power supply. Terminals 174 and 190 have six volts applied to them. The center tap of transformer secondary 230 connects through line 282 to "off" switch 3 and "on" switch 1.

When the circuit is immobilized, the relay 96 will have its contacts in the positions shown in the drawing and the relay will remain in the same position if the handset is used for communication, but if it is desired to use the hands-free mode of operation, one will press the "on" button 1, a normally-open momentary-contact push button switch, which will establish a contact from the center tap of winding 230 to ground, and from terminal 284, through line 286, to hook switch terminals 288, to line 290, through relay winding 292, to ground, through terminal 294. When relay coil 292 is energized, the relay contacts will all be brought down to their lower positions and establish a holding circuit. The holding circuit can be traced starting at the center tap of secondary 230, and passing through line 282, switch 3, line 296, through relay points 298, to terminal 300, through coil 292 to operate it, line 290, hook switch contact points 288, line 286, to terminal 284, through resistor 262, through line 261, and then through the rectifiers 258 and 260 to the windings 230 to the center tap.

In order to immobilize the speaker and microphone, one may press the momentary-contact, normally-closed, "off" switch 3, to open it and break the holding circuit. If the handset is to be used, the contact will be broken at contacts 288, when the hook switch is lifted.

When coil 292 is energized, contacts 302, 304, 98, 114, 238 and 298 close, and contacts 306, 308 and 309 open. The effect of this operation is to place the loudspeaker and microphone, with their attendant amplifiers, directly in circuit with the telephone line.

Line 94, starting in the hybrid network, makes contact through contact points 98 to line 100, through dial 102, to line 104, terminal 106 and telephone line 108. Line 118 makes contact through line 116, relay contacts 114, line 112, and terminal 110, to telephone line 108. Line 310 makes contact through points 304 to line 312, and dial 102, which provides for dialing pulse silencing.

The loudspeaker 162 connects from ground through line 163, through the secondary of transformer 160 to line 314, relay contacts 302 and line 316 to ground.

If the handset is lifted from the hook while the loudspeaker and microphone are in operation, they are immediately disconnected, as was indicated above, with the release of relay 96, on the deactivation of coil 292, and the return of the contacts to the positions shown in Fig. 4. This will also place the handset directly in the line automatically, since the release of the relay will close points 306, 308, and 309. The incoming signal from line 108 will then pass through terminal block 332, contacts 308, through line 318, through "*x*" contacts 320 to line 322, terminal 324 and line 326 to the receiver in the handset 328. Transmission from the handset microphone is through line 330 to terminal "10" on the terminal block 332, relay contacts 306, line 100, dial 102, line 104 to terminal 106, and out on telephone line 108.

In relay 96, contacts 306 and 308 make, before contacts 98 and 114 break, respectively, thus keeping the telephone hybrid 92 loaded until the filaments cool enough to reduce the gain below the feedback point. They also serve to transfer from hands-free operation to standard telephone operation, without flashing the operator at the switchboard.

Relay contacts 302 on relay 96 disconnect the loudspeaker from the output transformer 160 when the hands-free function is turned off, or when the handset is picked up while using the hands-free function, thus preventing any possibility of stored voltages, filament thermal inertia, etc., from causing a momentary feedback during the transfer operation.

When the hands-free function of the telephone substation is not in use, the contacts of the relay are as shown in Fig. 4. If the handset is used, the relay contacts will remain unchanged and the hookswitch will make its normal connection to the line.

When it is desired to use the hands-free function, pressing the "on" button 1 will ground the center tap of coil 230. There will then be a complete circuit from the end terminals of coil 230, through line 261, terminal 284, line 286, contacts 288 (providing the handset is in its cradle), line 290, winding 292, terminal 300 and line 293 to ground. Winding 292 will be activated by current through it.

The activation of coil 292 will close some of the contacts of relay 96, and open others to connect the hybrid network to the telephone line through lines 94, 118, and 310, and relay contacts 98, 114 and 304. The handset will, at the same time, be disconnected by relay contacts 306, 308 and 309.

It will then be possible to speak into the microphone 2 and be heard over a handset or through a loudspeaker at the other terminal of the telephone line; and, at the same time, to hear over the loudspeaker 162, what is being said at the other terminal.

The relay coil 292 may be deactivated in either of two ways to remove the hybrid network, the amplifiers, the microphone, and the speaker from the line. One way is to press "off" button 3, and the other is to lift the handset off the hook. When either of these operations is performed, the continuity of the holding circuit from the center tap of transformer winding 230, through line 282, relay contact 298, terminal 300, line 290, contacts 288, line 286, terminal 284, line 261 to the end terminals of winding 230 will be broken, and relay coil 292 will be deactivated. This immediately returns the relay to the condition shown in the drawing (Fig. 4).

While the invention has been illustrated and described in one embodiment, it is recognized that variations and changes may be made therein without departing from the invention as set forth in the claims.

We claim:

1. In a telephone substation, the combination comprising incoming and outgoing channel amplifiers, the outgoing amplifier including a negative feedback circuit and a connection through a transformer to a hybrid circuit, the input amplifier being fed by a transformer from a hybrid circuit through a high frequency attenuator, a connection from the input stage of the incoming channel amplifier to the cathode of the output stage of the output channel amplifier to further nullify signals from the output to the input stages, and means for connecting said hybrid circuit to a telephone line.

2. In a telephone substation, unitary housing means, first and second amplifying means interconnected by a hybrid network and mounted within the housing means, microphone input means connected to said first amplifying means, a loudspeaker connected to said second amplifying means and mounted within the housing means, a telephone handset mounted on the housing means, a telephone line, and a manually operable relay for alternately connecting the telephone line to either the telephone handset or the hybrid network.

3. In a telephone substation, a single housing means adapted to rest on a flat surface, acoustic isolating means mounted on the housing means to prevent mechanical coupling between the housing means and the surface on which it rests, first and second amplifying means interconnected by a hybrid network and mounted within the housing means, microphone input means connected to said first amplifying means, a loudspeaker connected to said second amplifying means and mounted within the housing means, a telephone handset mounted on the housing means, a telephone line, and a manually operable relay for alternately connecting the telephone line to either the telephone handset or the hybrid network.

4. In a telephone substation, unitary housing means, first and second amplifying means interconnected by a hybrid network and mounted within the housing means, microphone input means connected to said first amplifying means, manually operable short circuiting means connected across said microphone input means, a loudspeaker connected to said second amplifying means and mounted within the housing means, a telephone handset mounted on the housing means, a telephone line, and a manually operable relay for alternately connecting the telephone line to either the telephone handset or the hybrid network.

5. In a telephone substation, unitary housing means, first and second amplifying means interconnected by a hybrid network and mounted within the housing means, microphone input means connected to said first amplifying means, manually operable short circuiting means connected across said microphone input means, a loudspeaker connected to said second amplifying means and mounted within the housing means, said loudspeaker being mounted with its axis vertical so as to radiate in a substantially vertical direction, a telephone handset mounted on the housing means, a telephone line, and a manually operable relay for alternately connecting the telephone line to either the telephone handset or the hybrid network.

6. In a telephone substation, a single housing means adapted to rest on a flat surface, acoustic isolating means mounted on the housing means to prevent mechanical coupling between the housing means and the surface on which it rests, first and second amplifying means interconnected by a hybrid network and mounted within the housing means, microphone input means connected to said first amplifying means, manually operable short circuiting means connected across said microphone input means, a loudspeaker connected to said second amplifying means and mounted within the housing means, a telephone handset mounted on the housing means, a telephone line, and a manually operable relay for alternately connecting the telephone line to either the telephone handset or the hybrid network.

7. In a telephone substation, a single housing means adapted to rest on a flat surface, acoustic isolating means mounted on the housing means to prevent mechanical coupling between the housing means and the surface on which it rests, first and second amplifying means interconnected by a hybrid network and mounted within the housing means, microphone input means connected to said first amplifying means, manually operable short circuiting means connected across said microphone input means, a loudspeaker connected to said second amplifying means and mounted within the housing means, said loudspeaker being mounted with its axis vertical so as to radiate in a substantially vertical direction, a telephone handset mounted on the housing means, a telephone line, and a manually operable relay for alternately connecting the telephone line to either the telephone handset or the hybrid network.

8. In a hands-free telephone substation, a telephone line, a housing, a telephone handset mounted on the housing, first and second amplifying means interconnected by a hybrid network and mounted within the housing, microphone input means connected to said first amplifying means, switching means mounted on the housing for short circuiting the microphone input means, a loudspeaker mounted in the housing and connected to said second amplifying means, volume control means mounted on the housing for varying the gain of said second amplifying means, relay means for selectively connecting the telephone line to either the telephone handset or the hybrid network, and switching means mounted on the housing for controlling the action of the relay means.

9. In a hands-free telephone substation, a telephone line, a housing, a telephone handset mounted on the housing, first and second amplifying means interconnected by a hybrid network and mounted within the housing, microphone input means connected to said first amplifying means, switching means mounted on the housing for short circuiting the microphone input means, a loudspeaker mounted in the housing and connected to said second amplifying means, said loudspeaker being mounted with its axis vertical so as to radiate in a substantially vertical direction, volume control means mounted on the housing for varying the gain of said second amplifying means, relay means for selectively connecting the telephone line to either the telephone handset or the hybrid network, and switching means mounted on the housing for controlling the action of the relay means.

10. In a hands-free telephone substation, a telephone line, unitary housing means adapted to rest on a flat surface, acoustic isolating means mounted on the housing means to prevent mechanical coupling between the housing means and the surface on which it rests, a telephone handset mounted on the housing means, first and second amplifying means interconnected by a hybrid network and mounted within the housing means, microphone input means connected to said first amplifying means, switching means mounted on the housing means for short circuiting the microphone input means, a loudspeaker mounted in the housing means and connected to said second amplifying means, volume control means mounted on the housing means for varying the gain of said second amplifying means, relay means for selectively connecting the telephone line to either the telephone handset or the hybrid network, and switching means mounted on the housing means for controlling the action of the relay means.

11. In a hands-free telephone substation, a telephone line, unitary housing means adapted to rest on a flat surface, acoustic isolating means mounted on the housing means to prevent mechanical coupling between the housing means and the surface on which it rests, a telephone handset mounted on the housing means, first and second amplifying means interconnected by a hybrid network and mounted within the housing means, microphone input means connected to said first amplifying means, switching means mounted on the housing means for short circuiting the microphone input means, a loudspeaker mounted in the housing means and connected to said second amplifying means, said loudspeaker being mounted with its axis vertical so as to radiate in a substantially vertical direction, volume control means mounted on the housing for varying the gain of said second amplifying means, relay means for selectively connecting the telephone line to either the telephone handset or the hybrid network, and switching means mounted on the housing for controlling the action of the relay means.

References Cited in the file of this patent

UNITED STATES PATENTS

| | | |
|---|---|---|
| 1,241,566 | Simmon et al. | Oct. 2, 1917 |
| 1,844,790 | Norviel et al. | Feb. 9, 1932 |
| 2,619,550 | Humphries | Nov. 25, 1952 |
| 2,681,989 | Cunniff | June 22, 1954 |
| 2,685,066 | Barney | July 27, 1954 |
| 2,702,371 | Sunstein | Feb. 15, 1955 |
| 2,786,099 | Beatty | Mar. 19, 1957 |
| 2,801,287 | Clemency | July 30, 1957 |